(12) United States Patent
Miyamoto

(10) Patent No.: US 6,820,130 B1
(45) Date of Patent: Nov. 16, 2004

(54) COMPUTER SYSTEM, COMPUTER NETWORK SYSTEM, COMPUTER AND RECORDING MEDIUM

(75) Inventor: Takashi Miyamoto, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/488,682

(22) Filed: Jan. 21, 2000

(30) Foreign Application Priority Data

May 14, 1999 (JP) .......................................... 11-134532

(51) Int. Cl.[7] .......................... G06F 13/00; G06F 13/14
(52) U.S. Cl. ....................... 709/235; 709/219; 709/232; 718/105
(58) Field of Search ................................. 709/100, 101, 709/102, 105, 219, 220, 226, 230, 231, 232, 235; 710/10

(56) References Cited

U.S. PATENT DOCUMENTS

| | | | |
|---|---|---|---|
| 5,005,122 A | | 4/1991 | Griffin et al. |
| 5,704,031 A | | 12/1997 | Mikami et al. |
| 5,918,021 A | * | 6/1999 | Aditya ....................... 709/235 |
| 5,958,062 A | | 9/1999 | Komasaka et al. |
| 6,029,189 A | * | 2/2000 | Ishida et al. ................ 709/105 |

FOREIGN PATENT DOCUMENTS

| | | | |
|---|---|---|---|
| GB | 2 325 766 A | 2/1998 | ............. G06F/9/44 |
| JP | 8-272643 | 10/1996 | |
| JP | 10-260859 | 9/1998 | |
| JP | 10-260860 | 9/1998 | |
| JP | 11-265300 | 9/1999 | |
| JP | 11-265301 | 9/1999 | |

OTHER PUBLICATIONS

Novell App Note—"Using ZEN works to Distribute and Manage Applications on a Network" Oct. 1998.
http://winfiles.cnet.com/apps/98/file–split.html.
http://www.basa.com/prodsplitty.htm.

* cited by examiner

*Primary Examiner*—Majid A. Banankhah
(74) *Attorney, Agent, or Firm*—Staas & Halsey LLP (57) ABSTRACT

A computer network system is disclosed, in which the process of distributing software resources from a server to clients is dispersed so that the downloading time and the data amount for each session of the distribution process is adjusted, thereby making it possible to reduce the load of the whole network at the time of distribution of the software resources.

12 Claims, 7 Drawing Sheets

| |
|---|
| PC11: TO DETERMINE IN ACCORDANCE WITH PREDETERMINED CONDITIONS WHETHER DIVIDE TRANSFER OF UPDATE DATA FROM SERVER UNIT 1 IS POSSIBLE |
| PC12: TO DIVIDE AND TRANSFER UPDATE DATA FROM SERVER UNIT 1 WHEN IT IS DETERMINED THAT DIVIDE TRANSFER IS POSSIBLE |
| PC13: TO SEQUENTIALLY ACCUMULATE DIVIDED AND TRANSFERRED DATA FROM SERVER UNIT 1 AND STORE THE SAME AS UPDATE DATA IN UPDATE DATA FILE 24 |
| PC14: TO STORE STORED UPDATE DATA OF UPDATE DATA FILE 24 IN OPERATING SYSTEM FILE 21 |
| PC15: TO READ FROM SERVER UNIT 1 AS PREDETERMINED CONDITIONS AT LEAST ONE OF POSSIBILITY OF DIVIDE TRANSFER, PRESENCES OR ABSENCES OF DESIGNATION OF PREFERENTIAL TRANSFER, OF DESIGNATION OF DUE DATE OF TRANSFER COMPLETION, OF LIMITATION OF NUMBER OF DIVIDE TIMES, OF LIMITATION OF TRANSFER DATA AMOUNT, RELATED TO UPDATE DATA TO BE TRANSFERRED FROM SERVER UNIT, AND PRESENCE OR ABSENCE OF LIMITATION DUE TO LOAD OF CLIENT UNIT 2 |

205M

COMPUTER SYSTEM, COMPUTER NETWORK SYSTEM, COMPUTER AND RECORDING MEDIUM

BACKGROUND OF THE INVENTION

The present invention relates to a computer system connected with two computers, and a computer network system connected with three or more computers, or more in particular to a function of distributing software resources to each client from a server in a client/server system. Also, the invention relates to a computer connected with the computer network system for receiving the software resources distributed thereto, and a recording medium for recording a computer program for that purpose.

In a self-maintenance system for computers, a copy of data (application files, data files, etc.) are stored in a backup area as backup data, and in the case where a fault is found in a given data at the time of self-diagnosis, or in the case where the computer is infected by a computer virus, the data involved are rewritten and replaced by the data stored in the backup area thereby to recovery the data immediately.

In recent years, on the other hand, with the improvement in the computer performance, the use of a computer network system such as a client/server system connecting a plurality of computers by a network has extended. In the client/server system, a trouble affecting the whole network system is liable to occur due to an operating error of the user or a simple error in configuration. In such a case, the maintenance operation itself becomes impossible, often resulting in a system down before the trouble is eliminated. This likelihood increases with the number of computers connected to the network. With the increase in the size of the network system, therefore, the resulting economic loss cannot be ignored. The self-maintenance, therefore, is more crucial for a network system such as the client/server system than for a stand-alone computer used in isolation.

Further, a system such as a client/server system using a plurality of computers as clients and servers, the infection by computer viruses has recently posed a serious problem. Specifically, once a computer virus intrudes one of a plurality of the computers making up a client/server system, all the clients and servers are infected through the network, thereby leading to a serious loss. For operating the client/server system smoothly, therefore, an efficient system maintenance is very important.

With the computer network system such as the client/server system described above, in the case where software resources or new application software is installed in a client, for example, the particular data are registered in a server. Also, in the case of version up or bug correction of the application software used currently by a client, the difference data are registered in the server. In any of these cases, the operating environment of individual clients is renewed by distributing the registered data to the clients from the server.

The process of distributing the software resources in the client/server system making up a computer network system is conventionally carried out as a collective process in downloading from the server to each client and setting the downloaded software resources as the ones available for use by each client. In the meantime, no client can be operable before the completion of the process (downloading and the application processing of the update data) for distributing the software resources to all the clients connected to the network.

Also, the operating system (OS) and the application software of the individual computers have recently increased in size and have become complicated. With the increase in the size of the operating system and the application software and the increase in the number of clients connected to the network as described above, the distribution of the software resources has come to consume a considerable length of time. Thus, the distribution of software resources from the server to the clients requires an ever-increasing length of time, which tends to increase the time during which the clients cannot be used.

SUMMARY OF THE INVENTION

The present invention has been developed in view of the situation described above and the object thereof is to provide a computer system network in which the process for distributing software resources from a server to clients is dispersed to adjust the download time and the data amount for each distribution process thereby reducing the load of the whole network at the time of distributing software resources. Another object of the invention is to provide a computer connected to the computer network system for receiving the software resources distributed thereto, and a recording medium with a computer program being recorded for realizing such a process with a general-purpose computer.

According to the present invention, there is provided a computer network system such as a client/server system, in which in short, update data are divided and downloaded from a first computer (server unit, for example) to a second computer (client unit).

A computer system according to the invention comprises a first computer including a data storage unit for storing data to be used by other computers, is connected with a second computer including an operating data storage unit for storing data used for the operation of the second computer, the second computer receiving the transferred data stored in the data storage unit of the first computer and storing it in the operating data storage unit of the second computer thereby to use the particular data, wherein the first computer includes a transfer condition storage unit for storing the conditions for transferring the data stored in the data storage unit to the operating data storage unit of the second computer, and the second computer includes a determination unit for determining the possibility of dividing and transferring the data stored in the data storage unit of the first computer in accordance with the contents stored in the transfer condition storage unit of the first computer, a transfer processing unit for dividing and transferring the data stored in the data storage unit of the first computer in the case where the determination unit determines that the divide transfer is possible, and a data storage unit for sequentially accumulating and storing the data which the transfer processing unit causes the first computer to divide and transfer from the data storage unit of the first computer, the data stored in the data storage unit being adapted to be stored in the operating data storage unit.

More specifically, the computer system according to the invention wherein a first computer including a storage unit for storing data to be used by other computers, is connected with a second computer including a storage unit for storing data used for the operation of the second computer, the second computer receiving the transferred data stored in the storage unit of the first computer and storing it in the storage unit of the second computer thereby to use the same data, wherein the first computer stores the conditions for data transfer to the storage unit, of the second computer in the own storage unit, and the second computer includes a control unit connected to the storage unit of the second computer and capable of performing the operation of determining whether the divide transfer of the data stored in the storage unit of the first computer is possible or not according to the transfer conditions stored in the storage unit of the first computer, the operation of causing the first computer to divide and transfer the data stored in the storage unit of the first computer in the case where it is determined that the divide transfer is possible, and the operation of sequentially accumulating and storing the data divided and transferred from the storage unit of the first computer in the storage unit of the second computer.

As described above, in a computer system according to the present invention, the data stored in the data storage unit of the first computer is divided and transferred to, at appropriate timing, and accumulated in the data storage unit of the second computer, and at the time point when all the data are transferred and stored as one data, the data are stored in the operating data storage unit and becomes available for use.

As a result, as compared with the conventional system in which the update data are collectively distributed and the second computer is not operable before the update data are completely distributed, the update data are divided and transferred in the intervals during the operation in the computer network system according to the invention.

Also, in the computer system according to the invention having the configuration described above, the conditions for transfer include at least one of the possibility of divide transfer, the presence or absence of the designation of preferential transfer, the presence or absence of the designation of the date of transfer completion, the presence or absence of the limitation of the number of times to divide the data, the presence or absence of the limitation of the amount of the data transferred at a time, related to the data stored in the data storage unit of the first computer and the presence or absence of the limitation due to the load of the second computer.

In the computer system according to the invention described above, the possibility of the divide transfer of the data to the second computer is determined according to the transfer conditions, and therefore it is possible to determine whether the data are divided and transferred in accordance with the operating conditions of the computer and, if divided and transferred, to set various conditions.

A computer network system according to the invention wherein at least one first computer including a data storage unit for storing data to be used by other computers, and a plurality of second computers each including an operating data storage unit for storing data used for the operation of the second computer, the second computer receiving the transferred data stored in the data storage unit of the first computer and storing it in the operating data storage unit of the second computer thereby to use the particular data, are connected by a network, wherein the first computer includes a transfer condition storage unit for storing the conditions for transferring the data stored in the data storage unit to the operating data storage unit of the second computers, and the second computers each include a determination unit for determining the possibility of dividing and transferring the data stored in the data storage unit of the first computer in accordance with the contents stored in the transfer condition storage unit of the first computer, a transfer processing unit for dividing and transferring the data stored in the data storage unit of the first computer in the case where the determination unit determines that the divide transfer is possible, and a data storage unit for sequentially accumulating and storing the data which the transfer processing unit causes the first computer to divide and transfer from the data storage unit of the first computer, the data stored in the data storage unit being adapted to be stored in the operating data storage unit.

More specifically, the computer network system according to the invention wherein at least one first computer including a storage unit for storing the data to be used by other computers, and a plurality of second computers each including a storage unit for storing the data used for the operation of the second computer, the second computer receiving the transferred data stored in the storage unit of the first computer and storing it in the own storage unit thereby to use the particular data, are connected by a network, wherein the first computer stores the conditions for data transfer to the storage unit of the second computer in the own storage unit, and the second computers each include a control unit connected to the storage unit of the second computer and capable of performing the operation of determining whether the divide transfer of the data stored in the storage unit of the first computer is possible or not according to the transfer conditions stored in the storage unit of the first computer, the operation of dividing and transferring the data stored in the storage unit of the first computer in the case where it is determined that the divide transfer is possible, and the operation of sequentially accumulating and storing the data divided and transferred from the storage unit of the first computer in the storage unit of the second computer.

As described above, in a computer network system according to the present invention, the data stored in the data storage unit of the first computer is divided and transferred to, at appropriate timing and accumulated in the data storage unit of each of the second computers, and at the time point when all the data are transferred to and stored in each of the second computers as one complete data, the data are stored in the operating data storage unit and becomes available for use.

Also, in the computer network system according to the invention having the configuration described above, the conditions for transfer include at least one of the possibility of divide transfer, the presence or absence of the designation of preferential transfer, the presence or absence of the designation of the date of transfer completion, the presence or absence of the limitation of the number of times to divide the data, the presence or absence of the limitation of the amount of the data transferred at a time, related to the data stored in the data storage unit of the first computer, and the presence or absence of the limitation due to the load of the second computer.

In the computer network system according to the invention described above, the possibility of the divide transfer of the data to the second computers is determined according to the transfer conditions, and therefore it is possible to determine whether the data are divided and transferred in accordance with the operating conditions of each of the second computers and, if divided and transferred, to set various conditions for each of the second computers.

A computer according to the invention comprises an operating data storage unit for storing data to be used for the own operation, the computer receiving the transferred data to be used by the computer from other computers and storing it in the operating data storage unit thereof thereby to use the particular data, the computer further comprising a determination unit for determining the possibility of dividing and transferring the data from other computers in accordance with predetermined conditions, a transfer processing unit for dividing and transferring the data from other computers in the case where the determination unit determines that the divide transfer is possible, and a data storage unit for sequentially accumulating the data which the transfer processing unit causes other computers to divide and transfer, the data stored in the data storage unit being adapted to be stored in the operating data storage unit.

More specifically, the computer according to the invention comprises a storage unit for storing the data to be used for the own operation, receives the transferred data to be used by itself from other computers and uses the particular data, the computer further comprising a control unit connected to the storage unit and capable of performing the operation of determining whether the divide transfer of the data from other computers is possible or not according to predetermined conditions, the operation of dividing and transferring the data from other computers in the case where it is determined that the divide transfer is possible, the operation of sequentially accumulating and storing the data divided and transferred from other computers in the storage unit, and the operation of rendering the stored data available for use for the own operation.

As described above, in a computer according to the present invention, the data from other computers is divided and transferred to, at appropriate timing, and accumulated in the data storage unit, and at the time point when all the data are transferred and stored as one complete data, the data are stored in the operating data storage unit and becomes available for use.

Also, in the computer according to the invention having the configuration described above, the predetermined conditions include at least one of the possibility of divide transfer, the presence or absence of the designation of preferential transfer, the presence or absence of the designation of the date of transfer completion, the presence or absence of the limitation of the number of times to divide the data the presence or absence of the limitation of the amount of the data transferred at a time, related to the data to be transferred from other computers, and the presence or absence of the limitation due to the own load.

In the computer according to the invention described above, the possibility of the divide transfer of the data is determined according to the transfer conditions, and therefore it is possible to determine whether the data are divided and transferred in accordance with the operating conditions of the computer and, if divided and transferred, to set various conditions.

According to the invention, there is provided a computer-readable recording medium having stored therein a computer program which causes a computer having an operating data storage unit for storing data to be used for the operation of the particular computer to receive the transferred data to be used by the computer from other computers and to store the data in the operating data storage unit, wherein the computer program includes program code means for causing the computer to determine according to predetermined conditions whether the divide transfer of the data from other computers is possible, program code means for causing the computer to split and transfer the data from other computers in the case where it is determined that the data can be divided and transferred, program code means for causing the computer to sequentially accumulate and store the data divided and transferred from other computers, and program code means for causing the computer to store the stored data in the operating data storage unit.

In this way, a computer is realized in which each program code means stored in the recording medium according to the invention is read by the computer, so that the data from other computers is divided and transferred to, at appropriate timing, and accumulated in the data storage unit, and at the time point when all the data are completely transferred and stored as one complete data, the data are stored in the operating data storage unit and becomes available for use.

Also, the recording medium according to the invention having the configuration described above further comprises program code means for causing the computer to read at least one of the predetermined conditions including the possibility of divide transfer, the presence or absence of the designation of preferential transfer, the presence or absence of the designation of the due date of transfer completion, the presence or absence of the limitation of the number of times to divide the data, the presence or absence of the limitation of the amount of the data transferred at a time, related to the data to be transferred from other computers, and the presence or absence of the limitation due to the own load.

In this way, a computer is realized, which is caused to read the program code means stored in the recording medium according to this invention and determine whether the data can be divided and transferred in accordance with the read conditions.

The above and further objects and features of the invention will more fully be apparent from the following detailed description with accompanying drawings.

DESCRIPTION OF THE PREFERRED EMBODIMENTS

Figure 1:
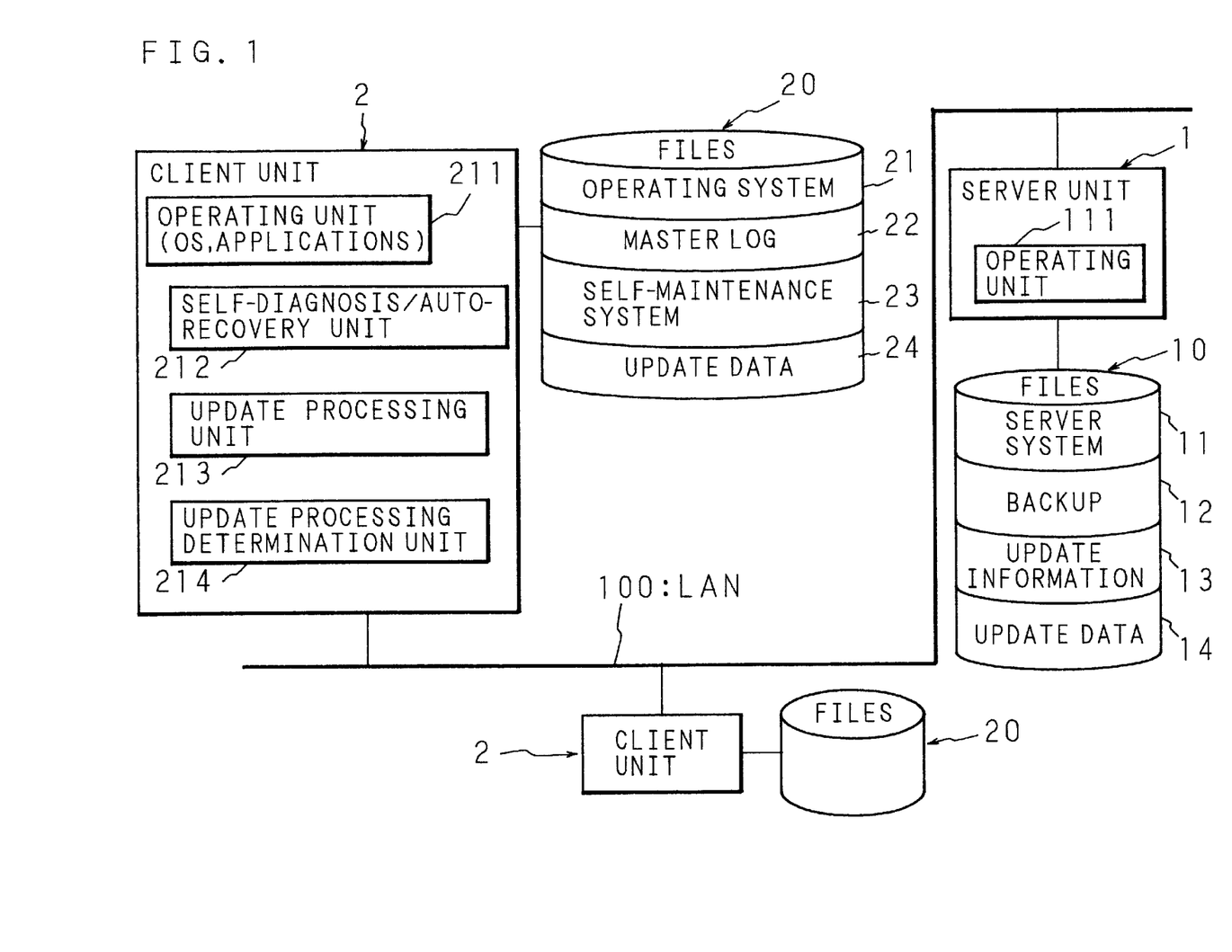
FIG. 1 is a block diagram showing an example configuration of a computer network system according to the invention.

The present invention will be described in detail below with reference to the diagrams showing embodiments thereof. FIG. 1 is a block diagram showing an example configuration of a computer network system according to the invention. A client/server system is shown as an example of the computer network system.

In FIG. 1, reference numeral 100 designates a LAN, numeral 1 designates a sever computer (hereinafter referred to as the server unit), and numeral 2 designates client computers (hereinafter referred to as the client units). These component parts are connected to the LAN 100 and constitute a client/server system as a network system. To one LAN is connectable a plurality of the server units 1 and the client units 2. In the case under consideration, however, one server unit 1 and two client units 2 are connected to the LAN 100. Nevertheless, a computer system can be configured in which only one server unit 1 and only one client unit 1 are connected.

Also, the client unit 2 is a computer according to the invention, and by being caused to read the program code from a recording medium according to the invention to be described later, functions as a client unit 2 connected to the client/server system constituting a computer network system according to the invention.

The server unit 1 and the client unit 2 are each a general-purpose personal computer having such hardware units as a CPU, a memory, a disk unit (hard disk, flexible disk, etc.), a printer, a display unit, a keyboard, a mouse, and the like. Each unit is connected with large capacity storage media 10, 20 using the hardware such as a hard disk, a magnetic tape etc., and installed with the OS (operating system) and various software.

The storage medium 10 of the server unit 1 has stored therein the information in files such as a server system file 11, a backup file 12, an update information file 13 and an update data file 14.

The server system file 11 has filed and stored therein the OS and various application software required for the operation of the server unit 1. When these software are executed by the server unit 1, the server system file 11 functions as an operating unit 111. Also, backup data for each client 2 is stored in the backup file 12.

The update information file 13 has stored therein various information on the update data registered in the update data file 14. The various information include not only the unique information such as the size of individual update data but also the conditions for downloading to the client unit 2, including whether divide downloading or only collective downloading is possible, whether immediate (preferential) downloading is required or normal downloading will do, whether the due date of downloading completion is designated, whether the number of times is designated for the divide downloading, the amount of transfer data for each session of the divide downloading, and the client load conditions permitting the downloading. These conditions are registered in advance as download conditions.

The update data file 14 has stored therein the update data. The update data are read from outside or from other computers through the LAN 100 as required by the operating unit 111 of the server unit 1 and stored in the update data file 14.

The storage medium 20 of the client unit 2 has stored therein an operating system file 21, a master log file 22, a self-maintenance system file 23, an update data file 24, and other information in the form of a file.

The operating system file 21 has stored therein the OS and various application software as a file required for a particular client unit 2. In the case where these software are executed by the client unit 2, the operating system file 21 functions as an operating unit 211. The operating unit 211 executes these functions in the case where the ordinary application software such as the word processor or the spread sheet stored in the operating system file 21 are executed by the client unit 2.

The master log file 22 holds the operation history of the client unit 2 and is referred to at the time of self-maintenance.

Also, the self-maintenance system file 23 has stored therein various software as a file required for the self-maintenance of the client unit 2. In the case where these software are executed by the client unit 2, the self-maintenance system file 23 functions as a self-diagnosis/auto-recovery unit 212, an update processing unit 213 and an update processing determination unit 214.

The update data file 24 stores temporarily therein the update data downloaded in divide form or collectively from the server unit 1. The update data downloaded collectively is transferred to the operating system file 21 from the update data file 24 and installed at the time of self-maintenance, and thus becomes available for use. Also, at the time of divide downloading, the update data file 24 sequentially accumulates the downloaded data portions until the whole of one update data is completely downloaded. Once the whole of one update data is completely downloaded, they are collectively installed in the operating system file 21 from the update data file 24 at the time of self-maintenance, and then becomes available for use.

The self-diagnosis/auto-recovery unit 212 executes the self-diagnosis of the client unit 2 itself at an appropriate timing such as when an instruction is received from the user or power is turned on, determines whether a file to be recovered by the backup data exists or not, and in the case where such a file is registered, recovers it by reading the required file from the backup file 12 of the server unit 1.

Also, the update processing unit 212 functions as an update data transfer processing unit, and referring to the contents of the update information file 13 of the server unit 1, determines the necessity of the update processing at an appropriate timing such as when an external input is discontinued for a predetermined length of time. The update processing determination unit 214 determines whether the update data from the server unit 1 are to be downloaded collectively or in divide form when the update processing unit 213 executes the update processing.

In this client/server system, when the power supply of the client unit 2 is turned on to start up, the self-diagnosis/auto-recovery unit 212 is activated by the self-diagnosis software stored in the self-maintenance system file 24 of the particular client unit 2. Then, the self-diagnosis of the client unit 2 is executed by the self-diagnosis/auto-recovery unit 212. A similar self-maintenance can be executed, however, by the user issuing an instruction at an arbitrary time point when the maintenance processing is possible to execute, as well as when power is turned on.

Once the self-diagnosis is executed by the self-diagnosis/auto-recovery unit 212, the contents of the operating system file 21 and the master log file 22 are compared with each other, and it is determined whether the system environment of the client unit 2, i.e. the folder/file of software, etc. are modified or newly prepared. In the case where there are data (folder/file) requiring recovery, the backup data are read from the backup file 12 of the server unit 1 and reinstalled in the operating system file 21, thus making it possible to recover the portions necessary to be recovered.

In normal case, the client unit 2 becomes available for operation in this way. At the time of self-maintenance of the client unit 2 or at an appropriate timing of subsequent normal operation such as when an external input is discontinued for a predetermined length of time, however, the update processing unit 213 performs the update processing, i.e. the downloading of the update data registered in the update data file 14 to the update data file 24.

Figure 2:
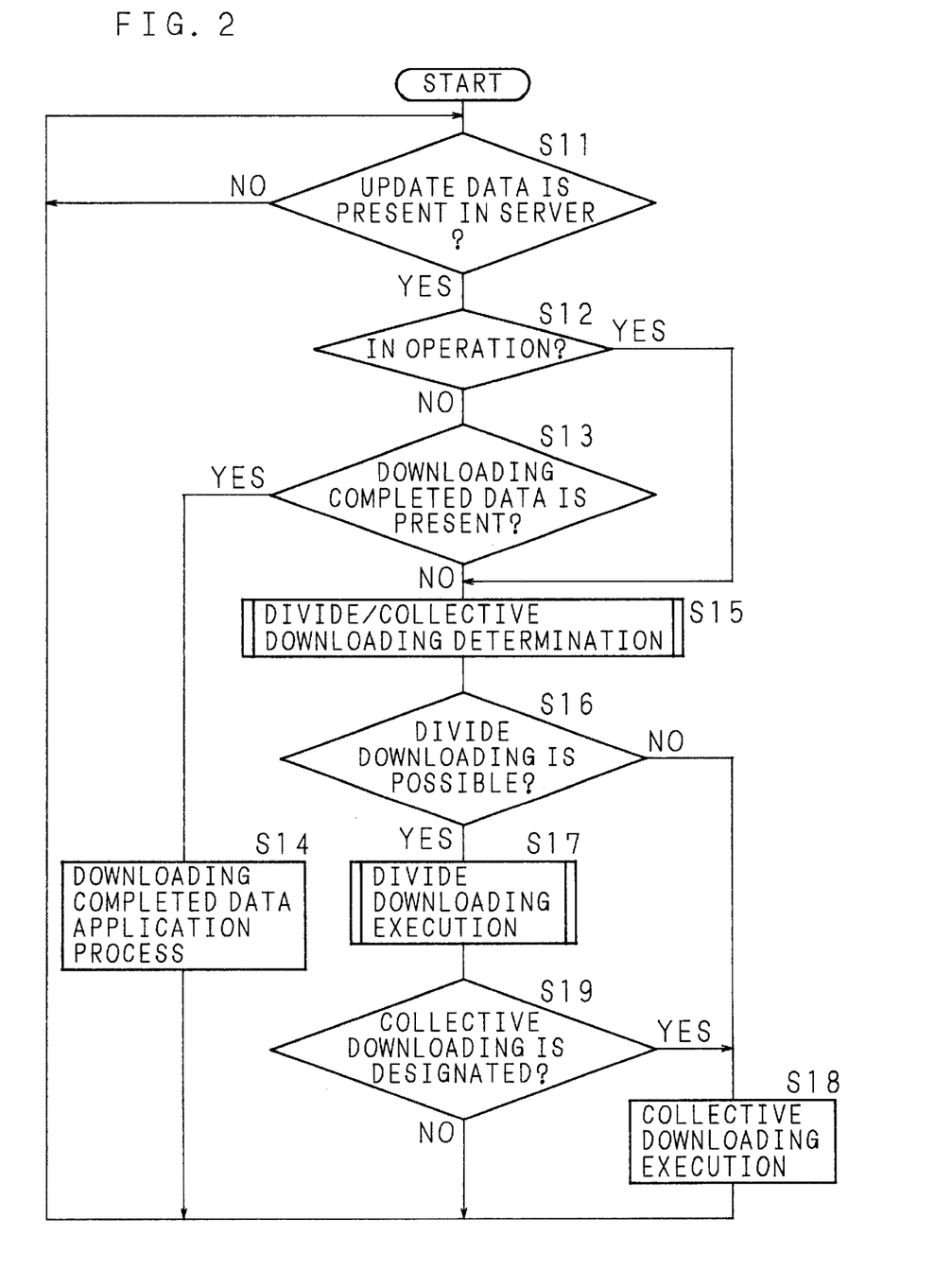
FIG. 2 is a flowchart showing the steps of the update processing of the computer network system according to the invention.

FIG. 2 is a flowchart showing the steps of the update processing of the computer network system according to the invention. With reference to this flowchart of FIG. 2, the steps of the update processing executed by the server unit 1 and the client unit 2 will be explained below.

The server unit 1 determines the presence or absence of the update data from the contents of the update information file 13 of the server unit 1 at an appropriate timing as described above (step S11). In the case where the update data is not registered (NO in step S11), the state at that time point, i.e. the operating state or the execution of the self-maintenance processing state is continued while executing the processing of step S11 again at the next appropriate timing.

In the case where the update data is registered (YES in step S11), on the other hand, the update processing unit 213 determines whether the client unit 2 is in operation or not, or specifically, whether the self-maintenance processing is not being executed or being executed (step S12). If the client unit 2 is not in operation (NO in step S12), i.e. in the case where the self-maintenance processing is being executed, the update processing unit 213 determines whether the downloading of some of the update data indicated by the contents of the update information file 13 is already completed or not (step S13).

In the case where there are some update data of which the downloading is completed, such data are stored in the update data file 24. Thus, the update processing unit 213 performs the application process for installing the particular update data in the operating system file 21 from the update data file 24 and rendering it available for use (step S14), and executing the processing of step S11 again at the next appropriate timing, determines whether other update data are registered in the update data file 14 of the server unit 1 or not.

In the case where there is no update data completely downloaded in step S13 (NO in step S13), or in the case where the client unit 2 has started the operation in step S12 (YES in step S12), the update processing unit 213 causes the update processing determination unit 214 to determine the update processing for the update data registered in the server unit 1 (step S15).

Figure 3:
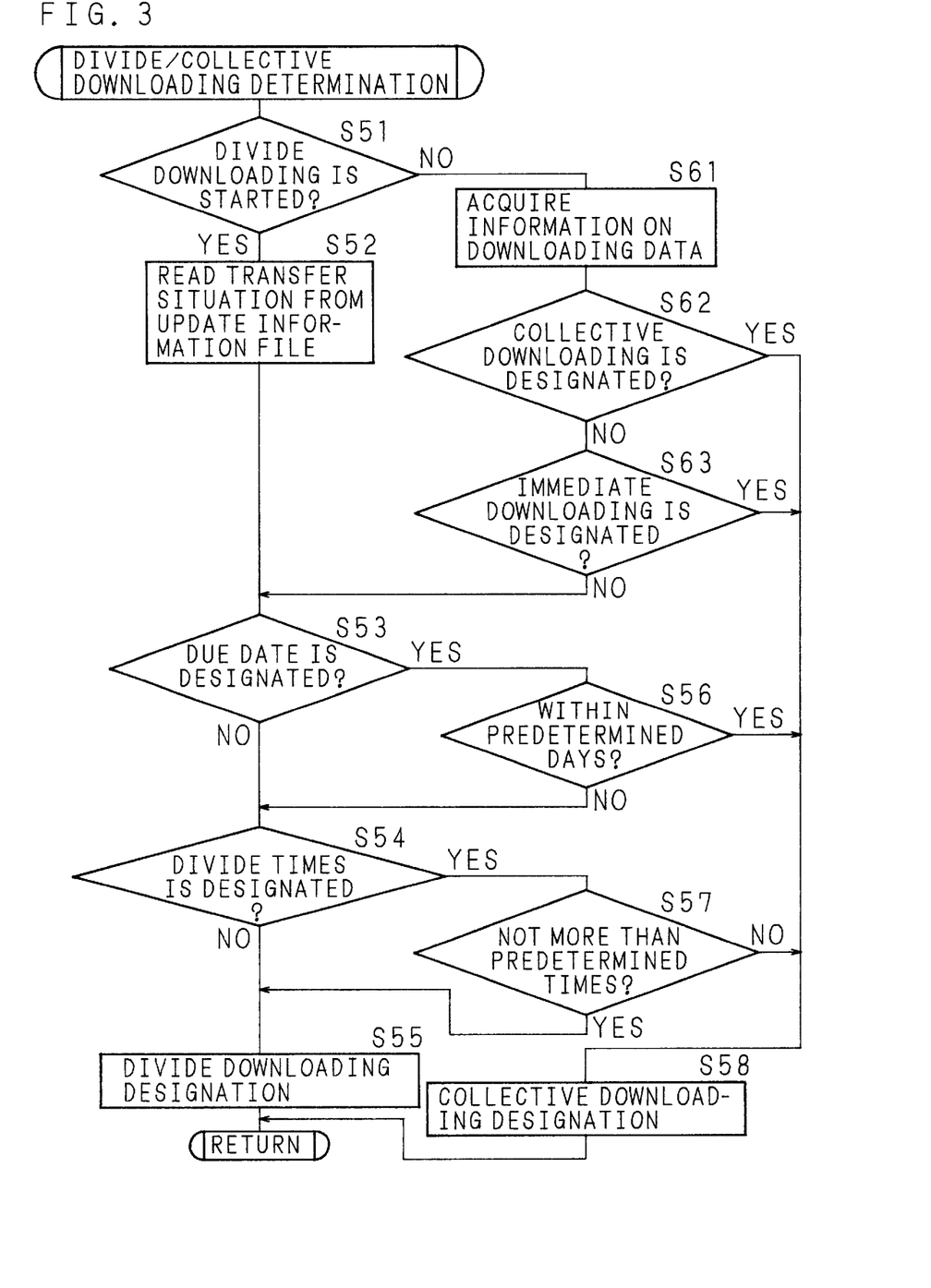
FIG. 3 is a flowchart showing the steps of determination of divide/collective downloading in the computer network system according to the invention.

FIG. 3 is a flowchart showing the steps of determining the divide or collective downloading in the computer network system according to the invention. This update processing is executed by the update processing determination unit 214.

First, in accordance with the contents of the update information file 13 of the server unit 1, the update processing determination unit 214 determines whether the divide downloading of the update data registered in the update data file 14 of the server unit 1 is already started or not (step S51). Specifically, it is determined whether the divide downloading of the update data registered in the update data file 24 of the server unit 1 to the client unit has been executed several times but not the whole downloading sessions have not yet been completed.

In the case where the divide downloading has been already executed several times (YES in step S51), the update processing determination unit 214 reads the transfer situation of the particular update data from the update information file 13 (step S52), and determines whether the update data includes the due date designation or not (step S53). In the case where the due date is not designated (NO in step S53), the update processing determination unit 214 determines from the contents of the update information file 13 of the server unit 1 whether the number of times is designated for dividing the particular update data (S54). In the case where the number of times for the dividing is not designated (NO in step S54), the divide downloading of the particular update data is designated (step S55) and the process returns to the main routine.

In the case where the due date is designated in step S53 (YES in step S53), on the other hand, the update processing determination unit 214 reads the designated due date from the update information file 13 of the server unit 1, and determines whether the designated due date is within a predetermined number of days from the present date (step S56). In the case where the designated due date is not within the predetermined number of days from the present date (NO in step S56), the process proceeds to step S54, while in the case where the designated due date is within the predetermined number of days from the present date (YES in step S56), in contrast, there is not enough time for divide downloading, and therefore the update processing determination unit 214 designates the collective downloading of the update data (step S58) and the process returns to the main routine.

In the case where the number of times to divide the update data is designated in step S54 (YES in step S54), the update processing determination unit 214 determines whether the designated number of times to divide the update data is not more than a predetermined number (step S57). In the case where the designated number of times to divide the update data is not more than a predetermined number (YES in step S57), the process proceeds to step S55 described above, while in the case where the designated number of times to divide the update data is more than a predetermined number (NO in step S57), on the other hand, the update processing determination unit 214 designates the collective downloading of the particular update data (step S58) and the process returns to the main routine. The reason for collective downloading in the case where the designated number of times to divide the update data for downloading is more than a predetermined number set in each client unit 2 is to avoid an excessive load being imposed on the client unit 2 by the execution of the divide downloading the predetermined number of times or more.

In the case where it is determined in step S51 that the divide downloading is not started (NO in step S51), on the other hand, it is not yet clear whether the particular update data can be downloaded in divide form or not, and therefore the update processing determination unit 214 makes the following determination. First, the update processing determination unit 214 acquires the information on the update data from the update information file 13 of the server unit 1 (step S61), and determines whether the collective downloading is designated or not (step S62). In the case where the collective downloading is designated (YES in step S62), the update processing determination unit 214 designates the collective downloading of the particular update data (step S58), and the process returns to the main routine.

In the case where the collective downloading is not designated (NO in step S62), on the other hand, the update processing determination unit 214 determines from the contents of the update information file 13 of the server unit 1 whether the immediate downloading is designated or not (step S63). In the case where the immediate downloading is designated (YES in step S63), the update processing determination unit 214 designates the collective downloading for immediately downloading the update data (step S58), and the process returns to the main routine. In the case where the immediate downloading is not designated (NO in step S63), on the other hand, the process proceeds to step S53 described above.

After the determination of the update processing in step S15 or specifically after the determination of the divide downloading or the collective downloading, the process is returned to the main routine shown in FIG. 2. In the case where the divide downloading is designated (YES in step S16), on the other hand, the divide downloading is executed once (step S17).

Figure 4:
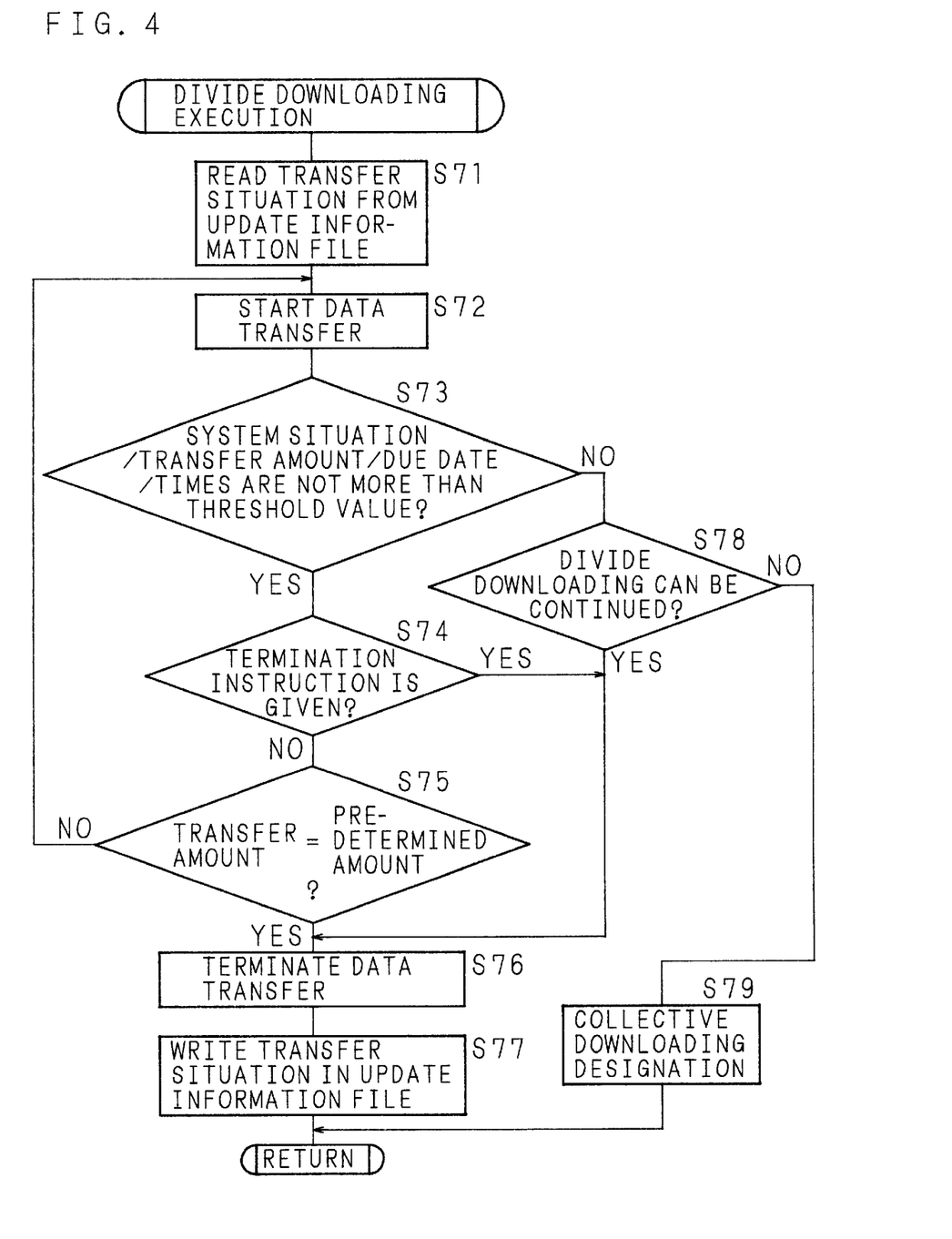
FIG. 4 is a flowchart showing the steps of divide downloading of the data in the computer network system according to the invention.

The processing of step S17 will be explained below. FIG. 4 is a flowchart showing the steps of the process for divide downloading in the computer network system according to the invention.

First, the update processing unit 213 of the client unit 2 reads the transfer situation of the update data from the update information file 13 of the server unit 1, or specifically, the past transfer situation of the update data to be downloaded in divide form (step S71). Then, in accordance with the transfer situation read from the update information file 13, the update processing unit 213 reads the update data of the update data file 14 of the server unit 1, from the top portion thereof in the case where no transfer is made in the past or from the following portion of the update file 14 in the case where several sessions of divide downloading are made in the past. Thus, the data transfer to the update data file 24 of the client unit 2 is started (step S72).

Once the transfer of the update data is started to the backup file 23 of the client unit 2 from the update data file 14 of the server unit 1 in this way, the update processing unit 213 checks whether the system situation, the transfer amount, the due date and the number of times are not more than the threshold values (step S72) and the presence or absence of the instruction for termination (step S74) while continuing to transfer the data until the data transfer amount reaches a predetermined amount set for a single session of divide downloading (YES in step S75).

In the case where any one of the system situation, the transfer amount, the due date and the number of times exceeds the threshold value (NO in step S73), the update processing unit 213 determines whether the divide downloading can be continued or not (step S78), and in the case where the divide downloading is impossible to continue (NO in step S78), the collective downloading is designated (step S79) and the process is returned to the main routine. In the case where the divide downloading is possible to continue (YES in step S78), on the other hand, the update processing unit 213 ends the data transfer temporarily (step S76), and writes the past data transfer situation up to the particular time point in the update information file 13 of the server unit 1 as the update data transfer situation (step S77) and the process is returned to the main routine.

In the case where an instruction to terminate the process is given from the server unit 1 or the client unit 2 (YES in step S74) or in the case where the data transfer amount reaches the predetermined value (YES in step S75), as in the preceding case, the process of steps S76 and S77 is executed and then the process is returned to the main routine.

In the case where the collective downloading is designated in the above-mentioned step S79, whether the collective downloading is designated or not is determined in step S19 after the process returns to the main routine shown in FIG. 2, and therefore the process proceeds to step S18 for executing the collective downloading.

After executing one session of divide downloading in this way, the process of S11 and subsequent steps is repeated at the next appropriate timing during the operation of the client unit 2. Thus, one update data is sequentially divided and downloaded and sequentially accumulated in the update data file 24 of the client unit 2, until the whole of one update data is downloaded from the update data file 14 of the server unit 1 to the update data file 24 of the client unit 2 is completed. In this case, when the next self-maintenance is executed in the client unit 1, the process of steps S12, S13, S14 is executed, and therefore the update data completely downloaded and accumulated in the update data file 24 is installed in the operating system file 21 and thus becomes available for use.

Also, in the case where the collective downloading is designated in step S15 (NO in step S16) or in the case where the collective downloading is designated during the processing operation of step S17 (YES in step S19), the collective downloading is executed (step S18). As a result, one update data is immediately downloaded collectively and stored in the update data file 24 of the client unit 2. In this case, when executing the next self-maintenance processing in the client unit 2, the process of steps S12, S13, S14 is executed, and therefore the update data completely downloaded and accumulated in the update data file 24 is installed in the operating system file 21 and becomes available for use.

Figure 5:
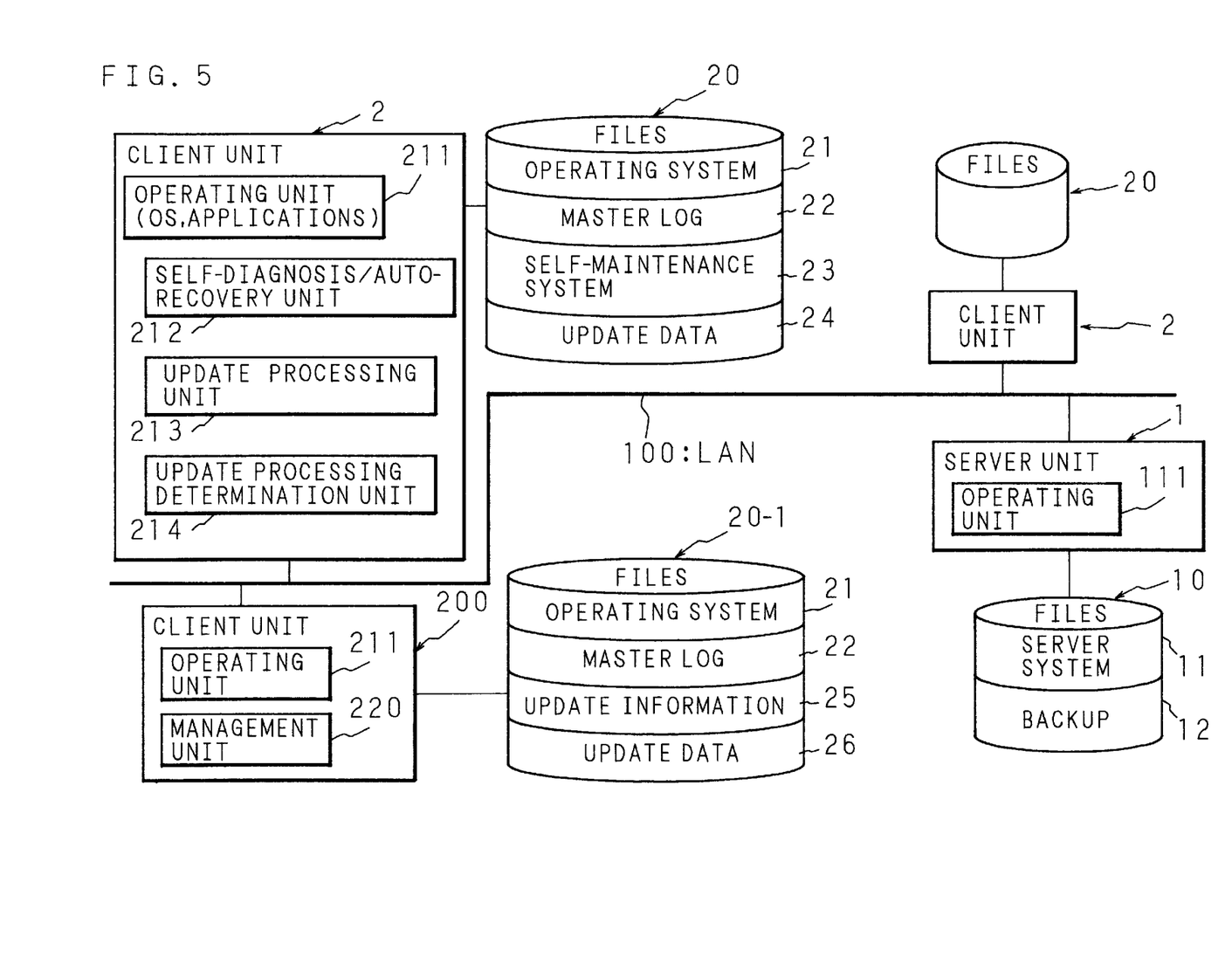
FIG. 5 is a block diagram showing a computer network system according to another embodiment of the invention.

FIG. 5 is a block diagram showing a computer network system according to another embodiment of the present invention. In this example, the update information file 13 and the update data file 14 included in the files of the server unit 1 shown in FIG. 1 are stored as an update information file 25 and an update data file 26, respectively, in a large capacity storage medium 20-1 connected to a client for management, different from the client unit 2 to be diagnosed, for example, unit 200 used by the manager for system management. Also, the client unit 200 for system management includes an operating unit 211 for the operation of the client unit 200 and a management unit 220 for system management.

In the computer network system shown in FIG. 5, the update data can be registered in the update data file 26 of the client unit 200 for management, and therefore various conditions for the update data registered in the update data file 26 can be easily set in the update information file 25 by the manager through the client unit 200.

The client unit 2 as a computer according to this invention described above can be realized by causing a general-purpose computer such as a personal computer to read and install a software program recorded in the recording medium.

Figure 6:
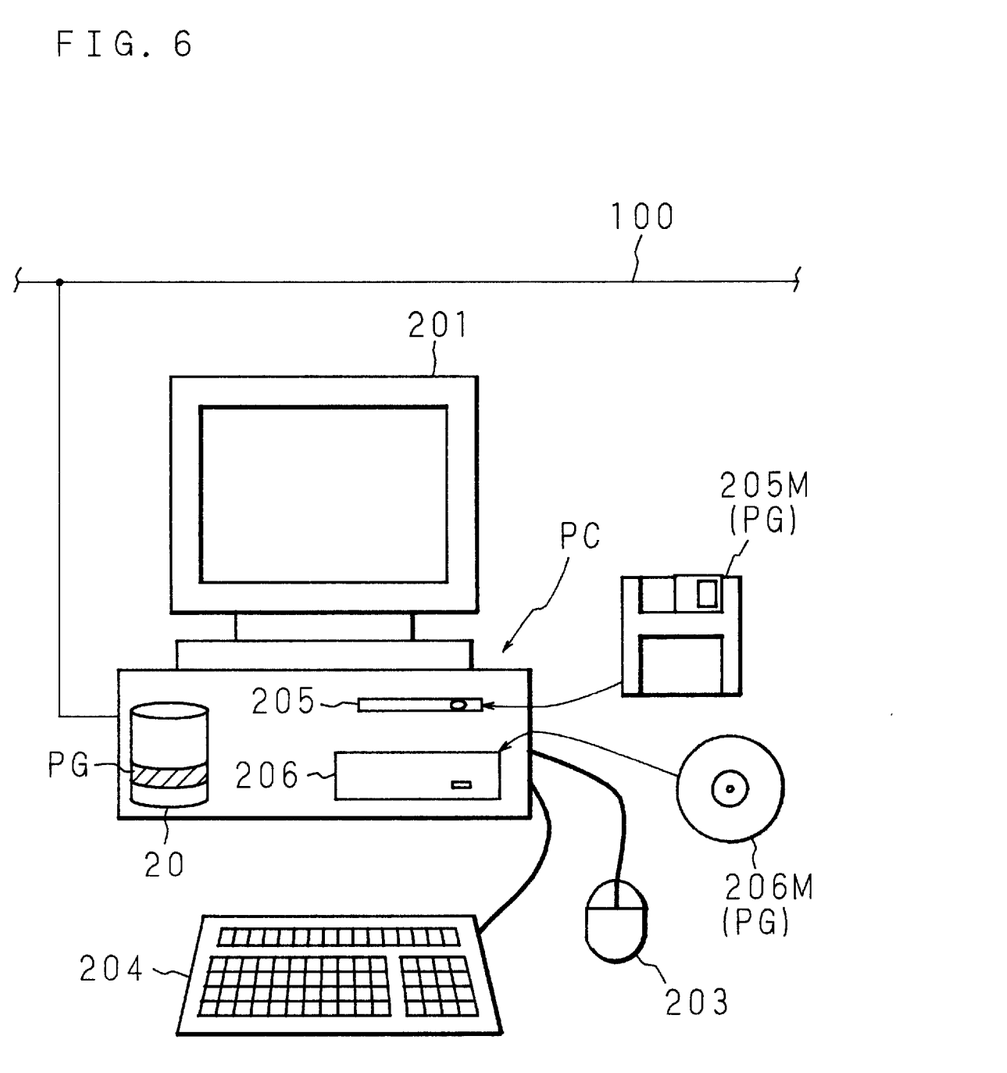
FIG. 6 is a schematic diagram showing a configuration example of a general-purpose computer according to the invention.

FIG. 6 is a schematic diagram showing a configuration example of a general-purpose computer making up a computer of the present invention. This general-purpose computer (personal computer) PC includes a flexible disk drive 205 for reading from a flexible disk 205M the code of the program PG recorded therein for providing the function of the client unit 2 as the computer according to the invention and/or a CD-ROM drive 206 for reading from the CD-ROM 206M the code of the processing program PG described above.

Reference numeral 201 designates a display unit such as a CRT display, numeral 203 a pointing device such as a mouse, and numeral 204 an input device such as a keyboard.

The code of the program PG read from the flexible disk 205M by the flexible disk drive 205 or the code of the program PG read from the CD-ROM 206M by the CD-ROM drive 206 is installed, in the recording medium 20 (10) using the hard disk, for example, and as described above, functions as various functional parts.

Although the flexible disk and/or the CD-ROM is shown as a recording medium in the figure, the invention is not limited to them but the magnetic tape, the magneto-optical disk, etc., can of course be used in combination with an appropriate drive (read means).

Reference numeral 100 designates a LAN for connecting other computers (server units) or the management center with the personal computer PC. Thus, the processing program PG can be installed from other computers or the management center through this LAN 100.

Figure 7:
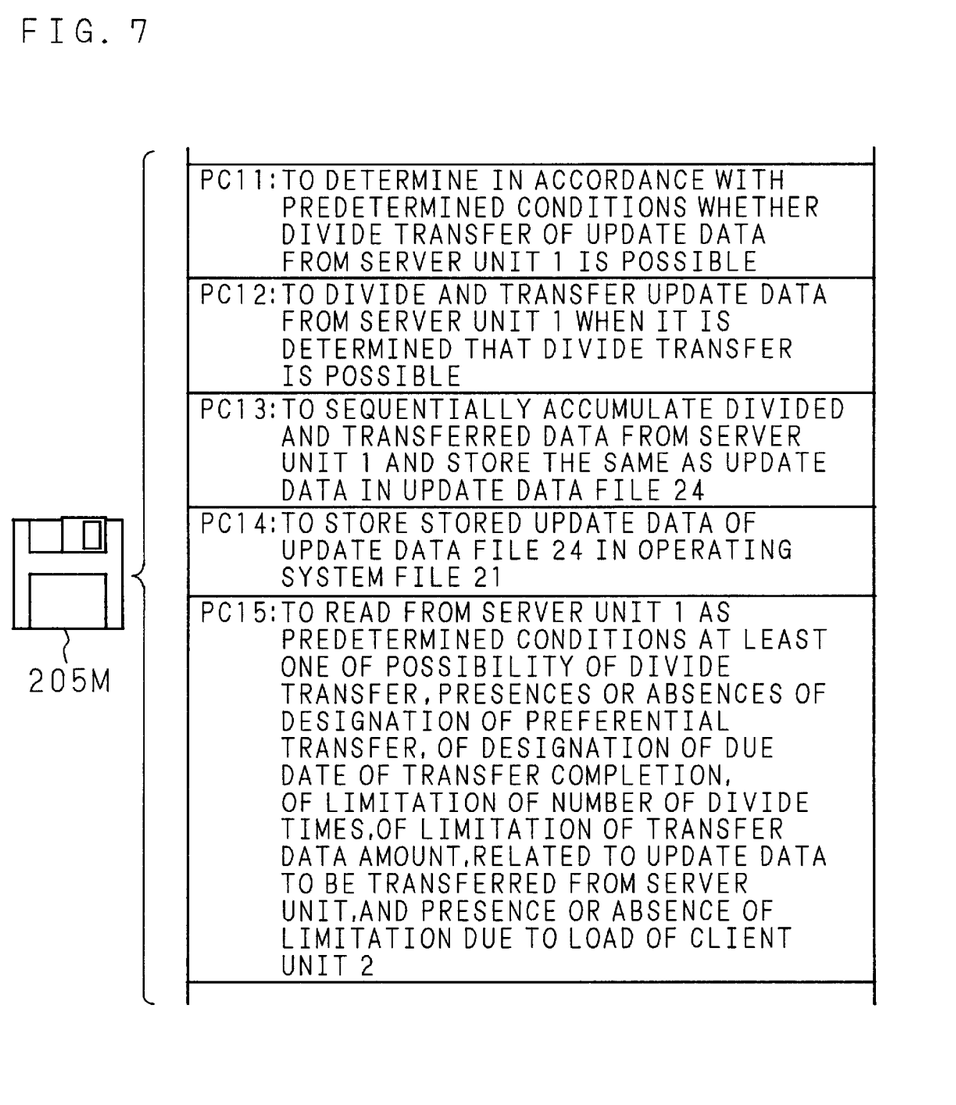
FIG. 7 is a schematic diagram showing the contents of the computer program recorded in a recording medium according to the invention.

FIG. 7 is a schematic diagram showing the contents of the computer program recorded in the recording medium according to the invention. Specifically, this diagram shows the contents of the program PG, i.e. the program code for realizing the function of the client unit 2 as the computer PC according to the invention recorded in the flexible disk 205M as an example of the recording medium.

The flexible disk 205M shown in FIG. 7 is a computer readable recording medium with a computer program being stored, whereby the client unit 2 having the operating system file 21 storing the data used for its own operation is caused to receive the update data to be used by itself transferred from the server unit 1 connected through the LAN 100 and store it in the operating system file 21.

The specific contents of the computer program include a program code PC11 used for determining in accordance with predetermined conditions whether the divide transfer of the update data from the server unit 1 is possible or not, a program code PC12 used for dividing and transferring the update data from the server unit 1 in the case where it is determined that the divide transfer is possible, a program code PC13 used for sequentially accumulating the update data divided and transferred from the server unit 1 and storing them as the update data in the update data file 24, and a program code PC14 used for storing the update data stored in the update data file 24, in the operating system file 21.

The computer program further includes a program code PC15 used for causing the computer to read from the server unit 1 at least one of a plurality of predetermined conditions including the possibility of divide transfer, the presence or absence of the designation of preferential transfer, the presence or absence of the designated due date of transfer completion, the presence or absence of the limitation of the number of times to divide the update data the presence or absence of the limitation of the amount of data to be transferred each time, related to the update data to be transferred from the server unit 1, and the presence or absence of the limitation due to the load of the client unit 2.

The program PG recorded in the flexible disk 205M as an example of this type of recording medium is read by a general-purpose computer, thereby providing the function of the client unit 2 according to the invention as described above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer system wherein a first computer including a data storage unit for storing data to be used by other computers is connected with a second computer including an operating data storage unit for storing data used for the operation thereof, the second computer receiving transferred data stored in the data storage unit of the first computer and storing the data in the operating data storage unit thereby to use the same data, said system comprising:

the first computer including a transfer condition storage unit to store conditions for transfer of the data stored in the data storage unit to the operating data storage unit of the second computer; and an update processing unit to determine if the second computer is in operation, and to start an update processing in the second computer when the second computer is not in operation, wherein the second computer further comprises:

a determination unit for to determine, in accordance with the contents stored in the transfer condition storage unit of the first computer, whether the data stored in the data storage unit of the first computer can be divided and transferred;

a transfer processing unit to divide and transfer the data stored in the data storage unit of the first computer when the determination unit determines that the data can be divided and transferred; and a data storage unit to sequentially accumulate and store the data which the transfer processing unit causes the first computer to divide and transfer from the data storage unit of the first computer, with the data stored in the data storage unit being adapted to be stored in the operating data storage unit.

2. A computer system according to claim 1, wherein said transfer conditions include at least one of a possibility of divide transfer, a presence or absence of a designation of preferential transfer, a presence or absence of a designation of a due date for transfer completion, a presence or absence of a limitation of a number of times to divide the data, a presence or absence of a limitation of an amount of the data transferred at a time, related to the data stored in the data storage unit of the first computer, and a presence or absence of a limitation due to a load of the second computer.

3. A computer network system wherein at least one first computer including a data storage unit for storing data to be used by other computers, and a plurality of second computers each including an operating data storage unit for storing data used for the operation thereof, the second computer receiving the transferred data stored in the data storage unit of the first computer and storing the data in the operating storage unit thereby to use the same data, are connected to each other by a network, said system comprising:

the first computer including a transfer condition storage unit to store the conditions for transfer of the data stored in the data storage unit to the operating data storage unit of the second computer; and an update processing unit to determine if one of the second computers is in operation, and to start an update processing in the one second computer when the one second computer is not in operation, wherein the second computers each further comprise:

a determination unit for to determine in accordance with the contents stored in the transfer condition storage unit of the first computer whether the data stored in the data storage unit of the first computer can be divided and transferred;

a transfer processing unit to divide and transfer the data stored in the data storage unit of the first computer when the determination unit determines that the data can be divided and transferred; and a data storage unit to sequentially accumulate and store the data which the transfer processing unit causes the first computer to divide and transfer from the data storage unit of the first computer, with the data stored in the data storage unit being adapted to be stored in the operating data storage unit.

4. A computer network system according to claim 3, wherein said transfer conditions include at least one of a possibility of divide transfer, a presence or absence of a designation of preferential transfer, a presence or absence of a designation of a due date for transfer completion, a presence or absence of a limitation of a number of times to divide the data, a presence or absence of a limitation of an amount of the data transferred at a time, related to the data stored in the data storage unit of the first computer, and a presence or absence of a limitation due to a load of the second computer.

5. A computer comprising an operating data storage unit for storing data used for the operation thereof, receiving the data to be used by itself transferred from other computers and storing the same data in the operating data storage unit thereby to use the same data, said computer further comprising:

an update processing unit to determine if the computer is in operation, and to start an update processing in the computer when the computer is not in operation;

a determination unit to determine, in accordance with predetermined conditions, whether divide transfer of the data from other computers is possible;

a transfer processing unit to divide and transfer the data from other computers when the determination unit determines that the data can be divided and transferred; and a data storage unit to sequentially accumulate and store the data which the transfer processing unit causes other computers to divide and transfer, wherein the data stored in the data storage unit is adapted to be stored in the operating data storage unit.

6. A computer according to claim 5, wherein said predetermined conditions include at least one of a possibility of divide transfer, a presence or absence of a designation of preferential transfer, a presence or absence of a designation of a due date for transfer completion, a presence or absence of a limitation of a number of times to divide the data, a presence or absence of a limitation of an amount of the data transferred at a time, related to the data to be transferred from the other computers, and a presence or absence of a limitation due to a load of the computer.

7. A computer readable recording medium for storing a computer program controlling a computer, including an operating data storage unit for storing data to be used for the operation of the computers to receive transferred data to be used by the computer from other computers and to store the same data in the operating data storage unit, said recording medium storing a computer program controlling a computer to:

determine if the computer is in operation, and to start an update processing in the computer when the computer is not in operation;

determine in accordance with predetermined conditions whether the data from other computers can be divided and transferred;

make other computers to divide and transfer the data when it is determined that the data can be divided and transferred;

sequentially accumulate and store the data divided and transferred from other computers; and store the stored data in the operating data storage unit.

8. A computer readable recording medium according to claim 7, further comprising program code controlling the computer to read at least one of said predetermined conditions including a possibility of divide transfer, a presence or absence of a designation of preferential transfer, a presence or absence of a designation of a due date for transfer completion, a presence or absence of a limitation of a number of times to divide the data, a presence or absence of a limitation of an amount of the data transferred at a time, related to the data transferred from the other computers, and a presence or absence of a limitation due to a load of the computer.

9. A condition based downloading method, comprising determining if a computer is in operation, and to start an update processing in the computer when the computer is not in operation;

determining whether data from another computer can be divided and transferred to the computer based on predetermined conditions if the computer is determined to be in operation and determining whether data from the other computer can be divided and transferred to the computer based on predetermined conditions after the update processing if the computer is determined to not be in operation; and dividing and transferring the data when it is determined that the data can be divided and transferred.

10. The condition based downloading method according to claim 9, further comprising sequentially accumulating the data divided and transferred from the other computer in the computer.

11. The condition based downloading method according to claim 9, wherein the predetermined conditions include a possibility of divide transfer, a presence or absence of a designation of preferential transfer, a presence or absence of a designation of a due date for transfer completion, a presence or absence of a limitation of a number of times to divide the data, a presence or absence of a limitation of an amount of data transferred at a time, related to data transferred from the other computer, and a presence or absence of a limitation due to a load of the computer.

12. The condition based downloading method according to claim 9, wherein when it is determined that the data cannot be divided and transferred then the data is transferred without division.

* * * * *

UNITED STATES PATENT AND TRADEMARK OFFICE
CERTIFICATE OF CORRECTION

PATENT NO. : 6,820,130 B1
DATED : November 16, 2004
INVENTOR(S) : Takashi Miyamoto It is certified that error appears in the above-identified patent and that said Letters Patent is hereby corrected as shown below:

Title page,
Item [56], References Cited, OTHER PUBLICATIONS,
"Novell App Note" reference, change "ZEN works" to -- Zenworks --; and change "http://www.basa.com" to -- http://basta.com --.

Column 13,
Line 57, after "storing" insert -- update --.
Line 60, before "transferred" insert -- the -- and after "transferred" insert -- update --.
Line 62, after "storing the" insert -- update --.
Line 63, after "same" insert -- update --.
Line 65, after "of the" insert -- update --.

Column 14,
Lines 1-2, delete "to determine if the second computer is in operation, and".
Line 4, after "operation" insert -- related to the update processing --.
Line 6, delete "for".
Lines 8 and 51, after "whether the" insert -- update --.
Lines 11 and 54, after "transfer the" insert -- update --.
Lines 13 and 56, after "that the" insert -- update --.
Lines 16 and 59, after "the" (first occurrence) insert -- update --.
Lines 18 and 61, after "with the" insert -- update --.
Line 26, after "divide the" insert -- update --.
Line 27, after "of the" insert -- update --.
Line 28, after "to the" insert -- update --.
Line 32, after "storing" insert -- update --.
Line 35, after "transferred" insert -- update --.
Line 36, after "storing the" insert -- update --.
Line 37, after "the same" insert -- update --.
Line 41, after "of the" insert -- update --.
Lines 44-45, delete "to determine if one of the second computers is in operation and".
Line 46, after "in" delete "the", after "one" insert -- of the --, and replace "computer" with -- computers --.
Line 47, after "not in" insert -- an -- and after "operation" insert -- related to the update processing --.

Column 15,
Line 5, after "divide the" insert -- update --.
Line 6, after "of the" insert -- update -- and after "to the" insert -- update --.
Line 11, after "receiving" delete "the" and insert -- update --.
Lines 13 and 14, after "the same" insert -- update --.

UNITED STATES PATENT AND TRADEMARK OFFICE
CERTIFICATE OF CORRECTION

PATENT NO.     : 6,820,130 B1
DATED          : November 16, 2004
INVENTOR(S)    : Takashi Miyamoto It is certified that error appears in the above-identified patent and that said Letters Patent is hereby corrected as shown below:

Column 15 (cont'd),
Lines 15-16, delete "to determine if the computer is in operation, and".
Line 18, after "not in" insert -- an -- and after "operation" insert -- related to the update processing --.
Line 20, after "whether" insert -- the --.
Line 21, after "the" insert -- update --.
Line 22, after "transfer the" insert -- update --.
Line 24, after "that the" insert -- update --.
Line 27, after "the" (first occurrence) insert -- update --.
Lines 29, after "wherein the" insert -- update --.
Line 36, after "divide the" insert -- update --.
Line 37, after "of the" insert -- update --.
Line 38, after "to the" insert -- update --.
Line 44, replace "computers" with -- computer, -- and after "transferred" insert -- update --.
Line 46, after "same" insert -- update --.
Line 49, delete "determine if the computer is in operation, and to".
Line 51, after "not in" insert -- an -- and after "operation" insert -- related to the update processing; --.
Line 53, after "whether the" insert -- update --.

Column 16,
Line 1, after "transfer the" insert -- update --.
Lines 2, 31 and 47, after "that the" insert -- update --.
Line 4, after "store the" insert -- update --.
Line 6, after "stored" insert -- update --.
Line 14, after "divide the" insert -- update --.
Line 15, after "of the" insert -- update --.
Line 16, after "to the" insert -- update --.
Line 19, after "comprising" insert -- : --.
Line 20, delete "determining if a computer is in operation, and to", change "start" to -- starting --.
Line 21, after "processing in" delete "the" and insert -- a --.
Line 22, after "not in" insert -- an -- and after "operation" insert -- related to the update processing --.
Line 23, after "whether" insert -- update --.
Line 25, after "condition" insert -- related to the update processing --.
Lines 25-26, delete "if the computer is determined to be in operation" and after "whether" insert -- the update --.
Line 30, after "transferring the" insert -- update --.

UNITED STATES PATENT AND TRADEMARK OFFICE
CERTIFICATE OF CORRECTION

PATENT NO. : 6,820,130 B1
DATED : November 16, 2004
INVENTOR(S) : Takashi Miyamoto It is certified that error appears in the above-identified patent and that said Letters Patent is hereby corrected as shown below:

Column 16 (cont'd),
Line 29, after "processing" insert -- related to a separate other update processing -- and delete "if the computer is determined to not be in operation".
Line 30, after "transferring the" insert -- update --.
Line 33, after "accumulating the" insert -- update --.
Line 42, after "divide the" insert -- update --.
Line 43, after "amount of" insert -- the update -- and after "related to" insert -- the update --.
Line 48, after "then the" insert -- update --.

Signed and Sealed this

Seventh Day of February, 2006

JON W. DUDAS
*Director of the United States Patent and Trademark Office*